United States Patent [19]

Sakai et al.

[11] Patent Number: 5,260,795
[45] Date of Patent: Nov. 9, 1993

[54] ELECTRONIC STILL CAMERA HAVING REMOTE CONTROL DEVICE

[75] Inventors: Nobuya Sakai, Alberta, Canada; Harumi Aoki, Tokyo, Japan

[73] Assignee: Asahi Kogaku Kogyo Kabushiki Kaisha, Tokyo, Japan

[21] Appl. No.: 881,062

[22] Filed: May 11, 1992

Related U.S. Application Data

[63] Continuation of Ser. No. 471,937, Jan. 29, 1990.

[30] Foreign Application Priority Data

Feb. 1, 1989 [JP] Japan .................. 1-23142

[51] Int. Cl.⁵ .............. H04N 5/76; H04N 5/781; H04N 5/26
[52] U.S. Cl. .................. 358/209; 358/906; 358/341
[58] Field of Search .......... 358/209, 210, 906, 909, 358/342, 229, 341; 360/32, 33.1, 10.1, 5, 35.1

[56] References Cited

U.S. PATENT DOCUMENTS

| | | | |
|---|---|---|---|
| 4,531,161 | 7/1985 | Murakoshi | 360/10.1 |
| 4,602,296 | 7/1986 | Murakoshi | 360/10.1 |
| 4,695,905 | 9/1987 | Utsugi | 360/33.1 |
| 4,725,897 | 2/1988 | Konishi | 360/10.1 |
| 4,746,990 | 5/1988 | Katoh et al. | 358/310 |
| 4,746,993 | 5/1988 | Tada | 358/335 |
| 4,792,866 | 12/1988 | Hirobi et al. | 360/10.1 |
| 4,807,051 | 2/1989 | Ogura . | |
| 4,816,928 | 3/1989 | Sasaki et al. | 360/10.1 |
| 4,819,101 | 4/1989 | Lemelson | 360/10.1 |
| 4,823,199 | 4/1989 | Sakakibara et al. | 358/335 |
| 4,858,031 | 8/1989 | Fukuta . | |
| 5,012,335 | 4/1991 | Cohodar | 358/108 |
| 5,014,136 | 5/1991 | Sakai et al. | 358/341 |

FOREIGN PATENT DOCUMENTS

| | | |
|---|---|---|
| 0186883 | 7/1986 | European Pat. Off. . |
| 3933187 | 4/1990 | Fed. Rep. of Germany . |
| 58-33369 | 2/1983 | Japan . |
| 58-182964 | 10/1983 | Japan . |
| 1-115276 | 5/1989 | Japan . |
| 1-117476 | 5/1989 | Japan . |

OTHER PUBLICATIONS

English Language Abstract of Japanese Publication Nos. 58-33369, 1-115276, and 58-182964.
French Search Report and Annex.

*Primary Examiner*—James J. Groody
*Assistant Examiner*—Glenton B. Burgess
*Attorney, Agent, or Firm*—Sandler Greenblum & Bernstein

[57] ABSTRACT

An electronic still camera includes a camera body which has recording device for recording electrical picture signals from an image pickup device and electrical so-and signals received by a sound receiver onto a recording medium, and an adaptor detachably mounted to the camera body. The adaptor has a sound memory for temporarily memorizing the sounds for a predetermined period of time to output the same to the camera body, and a remote controller for outputting a remote control signal for remotely controlling the operation of the camera body. The camera body has a control unit for controlling the operation of the camera in accordance with the remote control signal from the remote controller.

25 Claims, 3 Drawing Sheets

Fig — 1

ELECTRONIC STILL CAMERA HAVING REMOTE CONTROL DEVICE

This application is a continuation of presently pending application Ser. No. 07/471,937, filed on Jan. 29, 1990, the disclosure of which is expressly incorporated herein in its entirety.

BACKGROUND OF THE INVENTION

1. Field of the Invention

The present invention relates to an electronic still camera and more precisely, it relates to an improved remote control electronic still camera in which a remote control recording can be effected.

2. Description of Related Art

In conventional electronic still cameras in which an image of an object to be photographed is recorded as electrical signals, a focused image of an object is formed on a photoelectric converting surface of an image pickup device having a large number of photoelectric transducers which convert tile image to electrical signals which can be successively recorded on a magnetic disc.

There is also known an electronic still camera in which a sound can he recorded. In such a known electronic still camera in which sounds and a picture can be recorded simultaneously or in a predetermined relationship, using a self-timer, the time at which the sounds are recorded and the time at which the picture is taken are constant. Namely, an operator (photographer) can not control the time at which the sounds are recorded, independently of the time at which the picture is taken, Accordingly, for instance, in an electronic still camera in which the sound recording starts a predetermined time after the release operation (completion of the photographing), it is impossible to record, for example, a sum of voices before the release operation in a souvenir picture in which many people are taken.

In addition to the foregoing, in a conventional electronic still camera, a sound receiver (e.g. a microphone) is usually provided on a camera body. A separate sound receiver that is separable from the camera body is also known, which however, can record the sound waves only when it is integrally mounted to the camera body. Accordingly, in a remote control camera in which the release can be remote-controlled, if an object to be taken is far away from the camera body, a voice of the object can not be clearly recorded.

SUMMARY OF THE INVENTION

The primary object of the present invention is to provide a remote control electronic still camera in which the picture taking and the sound recording can be remotely controlled.

Another object of the present invention is to provide an electronic still camera in which sounds at a place far from the camera can be recorded.

To achieve the object mentioned above, in an electronic still camera including a camera body which has means for recording electrical picture signals converted by an image pickup device and electrical sound signals converted by a sound receiver onto a recording medium, and an adaptor that is detachably mounted to the camera body, according to the present invention, the adaptor comprises a sound memorizing means for temporarily memorizing the sounds for a predetermined period of time to output the same to the camera body, and a remote control operating means for outputting remote control signals for remotely controlling the operation of the camera body, the camera body comprising a control means for controlling the operation of the camera in accordance with the remote control signals from the remote control operating means.

With this arrangement, the release operation and the sound recording can be controlled by an operator who carries the adaptor separate from the camera body.

BRIEF DESCRIPTION OF THE DRAWINGS

The invention will be described below in detail with reference to the accompanying drawings, in which.

DESCRIPTION OF PREFERRED EMBODIMENTS

Figure 1:
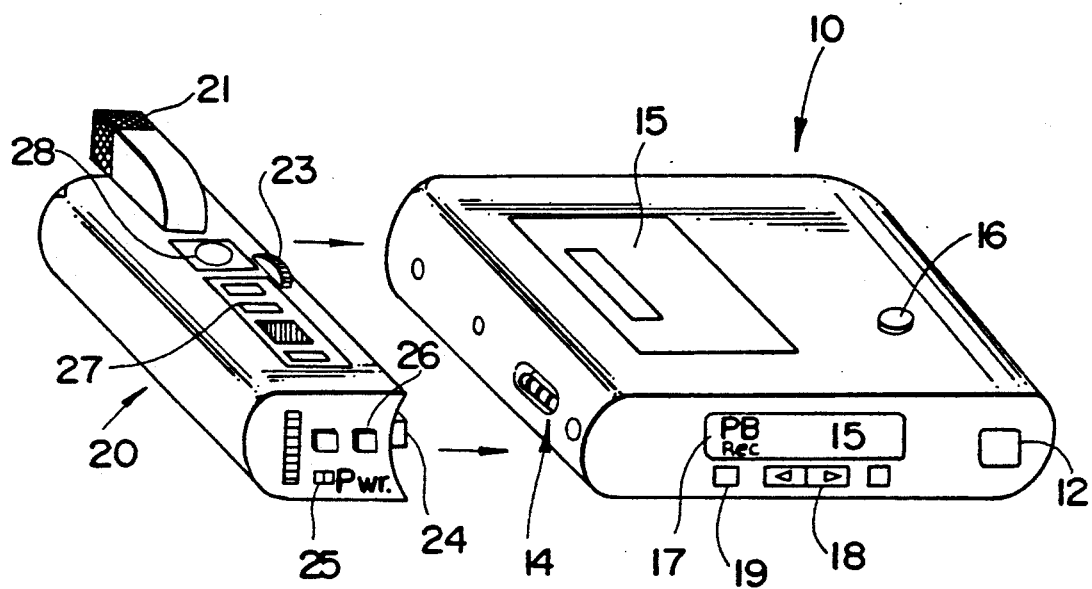
FIG. 1 is a perspective view of an electronic still camera according to an aspect of the present invention.

FIG. 1 shows a perspective view of an electronic still camera having a remote control device according to an embodiment of the present invention. The electronic still camera has a camera body 10 to record pictures and sounds, and a sound adaptor 20 which is used as an auxiliary device to record the sound waves and which is detachably mounted to the camera body 10.

The camera body 10 includes an optical system comprising a photographing lens 11 (FIG. 2) and a finder unit 12, an image processing and recording system comprising an image pickup device 30 (FIG. 2), and a driver for driving a magnetic disc 37, incorporated therein. Other members (not shown) necessary for recording pictures and sounds are also incorporated in the camera body.

The sound adaptor 20 has a microphone 21 that functions as a sound receiver and a RAM 22 that functions as a sound recording medium. Other sound recording members (not shown) are also incorporated in the sound adaptor 20.

The sound adaptor 20 is detachably mounted to the camera body 10 by a lock screw 23 that is provided on the sound adaptor 20. When the sound adaptor 20 is attached to the camera body 10, an adaptor connector 24 of the sound adaptor 20 is connected to a body connector 14 of the camera body 10.

The camera body 10 is provided on its upper surface with a disc cover 15 for loading the magnetic disc 37 (FIG. 2) and a release button 16, which is pushed down to commence the picture recording operation. On the rear side face of the camera body 10 are a display panel 17 which indicates photographing data, such as the number of tracks on which pictures have already been recorded, a control switch 18 for selecting the tracks on which pictures (and sounds) are to be recorded or which are to be played back and for starting the playback operation and a power switch 19.

Sound adaptor 20 has on its rear side face, a power switch 25 and a sound recording switch 26 which is actuated to commence the sound recording operation.

An infrared remote control device is incorporated in the camera body 10 and sound adaptor 20 to remotely control the camera body 10. The infrared remote control device includes a receiver 45 (FIG. 2) provided on the camera body 10 and a transmitter 28 (FIG. 1) provided on the sound adaptor 20. The receiver (infrared receiver) 45 is provided on the front face of the camera body 10. The transmitter (infrared transmitter) 28 and a remote control switch 27, which serves as an operating member of the remote control device, are provided on the upper surface of the sound adaptor 20. The infrared transmitter 28 emits infrared radiation which can be received by the infrared receiver 45.

Figure 2:
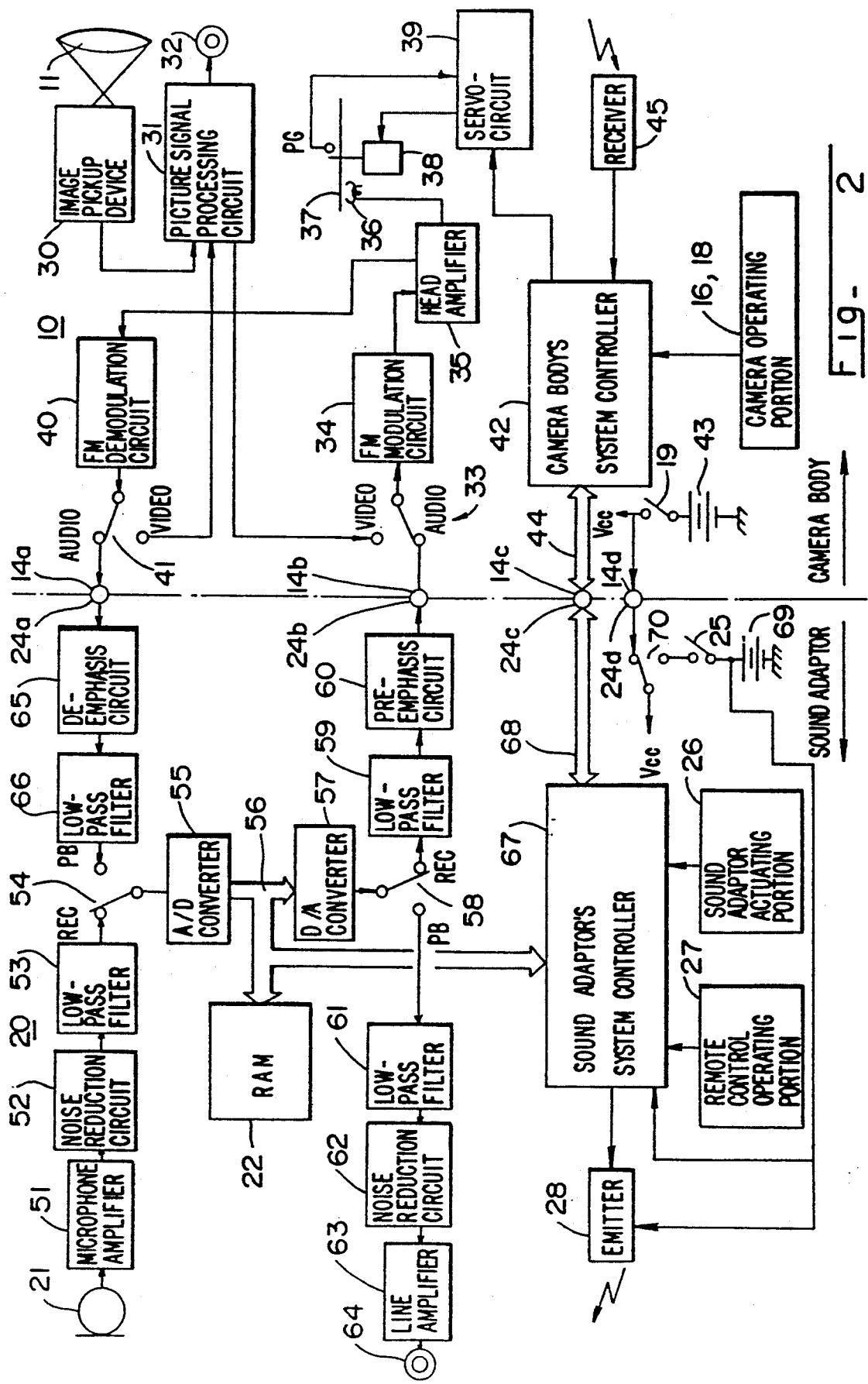
FIG. 2 is a block diagram of a main control circuit of an electronic still camera shown in FIG. 1; and, FIG. 3 is a perspective view of an different electronic still camera according to an another aspect of the present invention.

The following description will be directed to an electronical control circuit of an electronic still camera according to the present invention, particularly with reference to FIG. 2.

A focused image of an object to be photographed is formed on a photoelectric transducing surface of the image pickup device 30, so that the picture image is converted to electrical picture signals to be supplied to a picture signal processing circuit 31. The necessary processes of the picture signals are performed in the picture signal processing circuit 31 to be video signals consisting of a color difference signal and a luminance signal. The video signals are outputted from a picture output terminal 32 and a terminal "Video"of an AV selecting switch 33 to an FM modulation circuit 34 through a fixed terminal of the AV selecting switch 33.

The picture signals are FM-modulated by FM modulation circuit 34 and recorded on the magnetic disc 37 as FM modulation signals through a head amplifier 35 and a magnetic head 36.

The magnetic disc 37 is driven by a servo-motor 38 which is in turn driven by a servo-circuit 39 to be rotated at a predetermined revolution. The start and stop of the servo-circuit 39 is controlled by a system controller 42 of the camera body 10 which will be referred to as a body controller hereinafter and which will be described below in detail.

The head amplifier 35 is connected to an FM demodulation circuit 40 during the play-back operation. The picture signals recorded on the magnetic disc 37 are picked-up by the magnetic head 36 and inputted to the FM demodulation circuit 40 through the head amplifier 35. The picture signals demodulated by the FM demodulation circuit 40 are fed to the picture signal processing circuit 31 from the Video terminal of AV selecting switch 41 and are outputted from the picture signal output terminal 32. Upon playing-back, the sound signals, which are also recorded on the magnetic disc 37, are outputted from the Audio terminal of the AV selecting switch 41 to the body connector 14.

The electronic circuits mentioned above are generally controlled by the body controller 42. The body controller 42 is composed of, for example, a microcomputer having a ROM incorporated therein, so that the body controller 42 operates in accordance with the control program stored in the ROM to actuate the AV selecting switches 31 and 41.

To the body controller 42 are connected a group of switches including the release switch 16 and the control switch 18 as operation, switches. The body controller 42 controls the photographing operation and the play-back operation in response to ON/OFF signals from switches 16 and 18.

The infrared receiver 45 of the remote control device is connected to the body controller 42. The infrared receiver 45 receives the infrared pulse signals generated by the infrared emitter 28 to convert the pulse signals to electrical operation signals similar to the switches 16 and 18, so that the electrical operation signals can be outputted to the body controller 42. The body controller 42 commences the recording of pictures and sounds in accordance with the electrical operation signals inputted thereto.

Battery 43 is provided in the camera body 10 to supply electrical power to the electronic circuits through power switch 19 and is connected to battery terminal 14d of the body connector 14 through the power switch 19.

The main circuit of the sound adaptor 20 will be described below in detail.

The sound waves are converted to electrical sound signals in by the microphone 21. The electrical sound signals then amplified by a microphone amplifier 51. The amplified electrical sound signals are fed to a noise reduction circuit 52, in which the noise of the electrical sound signals is reduced. Furthermore, the high frequency component of the electrical sound signals is eliminated by a low-pass filter 53. The electrical sound signals are then fed to an A/D converter 55 from the Rec terminal of a record and play-back selecting switch circuit 54 through a fixed terminal to be converted to digital signals which are supplied to a data bus 56. The data bus 56 is connected to a RAM 22 and a D/A converter 57, which form the memorizing means and the transfer means, and a system controller 67 of the sound adaptor 20 which will be referred to as an adaptor controller hereinafter.

The digital sound signals converted by the A/D converter 55 are successively stored in the RAM 22. The sounds are recorded during the memorizing operation. The recording time depends on the recording time on the camera body side.

The D/A converter 57 converts the digital sound signals which are read from the RAM 22 through the data bus 56 at a high speed or a low speed to the analog signals. The analog sound signals are fed to low-pass filter 59 through the Rec terminal from the fixed terminal of a record and play-back selecting switch circuit 58, and are then outputted to a record terminal 24b of the adaptor connector 24, through a pre-emphasis circuit 60.

The record terminal 24b of the adaptor connector 24 is connected to record terminal 14b of the body connector 14, which is in turn connected to FM modulation circuit 34 through the Audio terminal and the fixed terminal of the AV selecting switch 33. Namely, the sound signals inputted to the camera body 10 from the record terminal 24b of the sound adaptor 20 are FM-modulated by the FM modulation circuit 34 in the camera body 10, so that the FM-modulated sound signals are recorded on the magnetic disc 37 through the head amplifier 35 and the magnetic head 36.

The D/A converter 57 is connected to a low-pass filter 61 through the other terminal, i.e., PB terminal of the record and play-back selecting switch 58. Upon play-back, the sound signals are slowly read out from the RAM 22 (i.e. under the extension of time axis) and are fed to the low-pass filter 61 from the D/A converter 57 through the fixed terminal of the record and play-back selecting switch 58 and the PB terminal. The sound signals are then outputted to a sound output terminal 64 through a noise reduction circuit 62 and a line amplifier 63. A sound reproducing device can be connected to the sound output terminal 64 to listen to the sound.

The A/D converter 55 is connected to the low-pass filter 66 through the PB terminal, i.e. the other switching terminal of the record and play-back selecting switch 54. The low-pass filter 66 is connected to a de-emphasis circuit 65, which is connected to the sound reproducing terminal 24a of the adaptor connector 24.

The sound reproducing terminal 24a is connected to the Audio terminal of the AV selecting switch 41 through the sound reproducing terminal 14a of the body connector 14. The fixed terminal of the AV selecting switch 41 is connected to the FM-demodulation circuit 40. The sound signals recorded on the magnetic disc 37 are inputted to the de-emphasis circuit 65 the sound adaptor 20 via the magnetic head 36, the head amplifier 35, the FM demodulation circuit 40, the AV selecting switch 41 and the sound reproducing terminals 24a and 14a.

The sound signals demodulated in the de-emphasis circuit 65 are supplied to the low-pass filter 66 and are then outputted to the A/D converter 55 from the PB terminal of the record and play-back selecting switch 54, so that the digital sound signals are memorized in the RAM 22 through the data bus 56.

When the memorization of the signals for one track is completed, the signals are slowly read through the data bus 56, and are then outputted to the sound output terminal 64 through the D/A converter 57, the record and play-back selecting switch 58 and the low-pass filter 61.

The adaptor controller 67 is composed of a microcomputer which generally controls the various electronic circuits of the sound adaptor 20 to write and read the data into and from the RAM 22 and control the selection of the record and play-back selecting switches 54 and 58. The adaptor controller 67 is connected to the body controller 42 through interface bus 68, the bus connectors 24c and 14c, and interface bus 44.

The record switch 26 (sound adaptor actuating portion) is connected to the adaptor controller 67, so that when the record switch 26 is turned ON by a user, the adaptor controller 67 commences the recording operation.

The remote control operating switch 27 (remote control operating portion) which is actuated by a user, is connected to the adaptor controller 67. The remote control operating switch 27 can control the recording operation and the play-back operation of the pictures of the camera body 10, similar to switches 16 and 18 on the camera body.

When the operation signal is issued from the remote control operating switch 27, adaptor controller 67 sends drive control signals, corresponding to the operation signal, to the infrared emitter 28 which converts the drive control signals into infrared pulse signals to be emitted.

The infrared receiver 45 of on the camera body 10 receives the infrared pulse signals emitted from the infrared emitter 28 and converts the same into electrical drive control signals to be outputted to the body controller 42. The body controller 42 then commences the necessary control, such as the recording operation in accordance with the electrical drive control signals.

The adaptor controller 67, remote control switch 27 and light emitter 28 form a signal emitter, and the body controller 42 and light receiver 45 form a signal receiver. The remote control device is composed of the signal emitter and the signal receiver.

Electrical power is supplied to the above-mentioned various electronic circuits from a battery 69 through power switch 25 and a battery switch 70. Battery switch 70 switches between battery 69 and battery 43 of the camera body 10. Battery switch 70 has a fixed terminal connected to the above-mentioned various components and a pair of switching terminals connected to the power switch 25 and battery terminal 24d of the adaptor connector 24, respectively. Battery terminal 14d of the camera body 10 connected to the battery terminal 24d is connected to battery 43 through the power switch 19.

Battery switch 70 is selectively connected to the body battery 43 and the incorporated battery 69 when the sound adaptor 20 is mounted to and dismounted from the camera body 10, respectively. The switching of the battery switch 70 is carried out by a switching mechanism, which is perse known.

The recording operation of the electronic still camera according to the present invention is as follows:

The following discussion will be first directed to the normal recording operation when the sound adaptor 20 is mounted to the camera body 10.

Power switches 19 and 25 of the camera body 10 and the sound adaptor 20 are turned ON prior to recording. When the record switch 26 of the sound adaptor 20 is turned ON, the adaptor controller 67 operates to switch the record and play-back selecting switches 54 and 58 so they are connected to the Rec terminals and send the sound record start signal to the body controller 42 through the interface buses 68 and 44. In response to the sound record start signal, the body controller 42 switches the AV selecting switch 33 so it is connected to the Audio terminal and drives the servo-motor 38 through the servo-circuit 39 to move the magnetic head to a desired track. This is ready for recording sounds.

The adaptor controller 67 actuates the recording circuit to commence the memorization of sound signals into the RAM 22. The sound waves received by the microphone 21 are successively stored in the RAM 22 after passing through the microphone amplifier 51, noise reduction circuit 52, low-pass filter 53, record and play-back selecting switch 54, A/D converter 50, and data bus 56.

When the record switch 26 is turned OFF or after the lapse of a predetermined recording time, the recording operation, and accordingly the memorization of the data into the RAM 22, is completed.

Thereafter, the sound signals stored in the RAM 22 are read out on the data bus 56 at a high speed and are outputted to the D/A converter 57. The sound signals are fed from the D/A converter 57 to the camera body 10 through the record and play-back selecting switch 58, low-pass filter 59, pre-emphasis circuit 60, and record terminals 24b and 14b.

The sound signals fed to the camera body from the sound adaptor 20 are recorded on the magnetic disc 37 by the magnetic head 36 after passing through the FM-modulation circuit 34, AV selecting switch 33 and head amplifier 35.

Upon playing-back the sound recorded on the magnetic disc 37, a user mounts the sound adaptor 20 onto the camera body 10. In this state, when the control switch 18 is actuated to be connected to the sound reproducing position, the sound is reproduced. The body controller 42 switches the AV selecting switch 41 to the Audio terminal to send the sound reproduction start signal to the adaptor controller 67 and to rotate the magnetic disc 37 in order to control the tracking of the magnetic head 36, so that the sound signals of the associated track can be read.

The sound signals which have been read by the magnetic head 36 are sent to the sound adaptor 20 via the head amplifier 35, FM-demodulation circuit 40 and AV selecting switch 41 and through the sound reproduction terminals 14a and 24a.

In the sound adaptor 20, the adaptor controller 67 switches the record and play-back selecting switches 54 and 58 to the PB terminal to be ready for the sound reproduction. The sound signals inputted to the sound reproduction terminal 24a from the camera body 10 are successively stored in the RAM 22 through the de-emphasis circuit 65, low-pass filter 66, record and play-back selecting switch 54, A/D converter 55 and data bus 56.

Upon the completion of the memorization of the sound signals for one track, the sound signals stored in the RAM 22 are slowly read (i.e. under the extension of the time axis) to be outputted to the D/A converter 57. The sound signals are then sent to the low-pass filter 61 via the record and play-back selecting switch 58, and then to the sound output terminal 64 through the noise reduction circuit 62 and line amplifier 63. The sounds can be reproduced when a sound reproduction device (i.e., sound play-back device) is connected to the sound output terminal 64.

The sound recording operation and the remote control operation when the sound adaptor 20 is separated from the camera body 10 are as follows:

The system controllers 67 and 42 detect whether or not the sound adaptor is dismounted from the camera body 10 through the interface buses 68 and 44, respectively.

The sound adaptor 20 can be moved to an optional position away from the camera body 10. When the record switch 26 is turned ON at a position away from the camera body 10, the adaptor controller 67 switches the record and play-back selecting switches 54 and 58 to the Rec terminals, respectively. In this state, when the record switch 26 is turned ON, the sound waves received by the microphone 21 are successively stored in the RAM 22 via the microphone amplifier 51, noise reduction circuit 52, low-pass filter 53, record and play-back selecting switch 54, A/D converter 55 and data bus 56.

The adaptor controller 67 stops the memorization of the signals into the RAM 22 when the record switch 26 is turned OFF or after the lapse of a predetermined recording time.

The operation of the sound adaptor 20, as mentioned above is similar to that of the sound adaptor 20 when mounted onto the camera body 10. However, when the sound adaptor 20 is separated from the camera body 10, the signals stored in the RAM 22 are held therein until the sound adaptor 20 is mounted onto the camera body 10.

The time in which one sound recording can be effected corresponds to the sound recording time of the camera body 10. The number of recordings depends on the memory capacity of the RAM 22 which ensures at least one sound recording.

The sound signals stored in the RAM 22 are finally recorded on the magnetic disc 37 when the sound adaptor 20 is mounted onto the camera body 10. When the sound adaptor 20 in which the sound waves are recorded in the RAM 22 is mounted onto the camera body 10, the adaptor controller 67 sends a detection signal to indicate that the sound signals are stored in the RAM 22 to the body controller 42. In response to the detection signal, the body controller 42 brings the camera body to a ready position for the sound recording.

Thereafter, the adaptor controller 67 reads the sound signals stored in the RAM 22 at a high speed to feed the same to the D/A converter 57. The sound signals which are converted to analog signals in the D/A converter 57 are fed to the camera body 10 via the record and play-back selecting switch 58, low-pass filter 59, pre-emphasis circuit 60 and record terminal 24b.

The sound signals fed from the sound adaptor 20 are recorded on the magnetic disc 37 via the FM-modulation circuit 34, head amplifier 36 and magnetic head 36. This completes the recording operation.

Battery switch 70 is selectively connected to the body battery 43 and the incorporated battery 69 when the sound adaptor 20 is mounted onto and dismounted from the camera body 10, respectively. The selective connection decreases a power consumption of the incorporated battery 69 in the sound adaptor 20.

The following discussion will be directed to the remote control operation. The sound adaptor 20 is dismounted from the camera body 10, which is held by a tripod or the like. A photographer who carries the sound adaptor 20 moves to a desired position away from the camera body 10.

Upon taking a picture, the photographer adjusts the signal emitter 28 to face the signal receiver 45 and turns ON the release switch of the remote control operation switch 27. As a result, the release signal is emitted from the signal emitter 28 to the signal receiver 45, so that the body controller 42 commences photographing.

Upon recording the sounds, the record switch 26 is pushed down. Consequently, the sound signals are memorized in the RAM 22, as mentioned before. Since the sound recording operation in the sound adaptor 20 is effected independently of the picture taking operation in the camera body 10, when the release switch is pushed down during the recording of the sounds, a picture of an object whose voice is being recorded, can be taken.

In an alternative arrangement, a signal can be added to indicate that desired sound signals are recorded in the data signals which are recorded together with the picture signals, so that when pictures are continuously taken, a subsequent recording track is skipped. In this alternative, when the sound adaptor 20 is mounted onto the camera body 10, the sound signals stored in the sound adaptor 20 can be recorded on the skipped track. This makes it possible to play-back the pictures and sounds in a predetermined relationship.

As can be understood from the foregoing, according to the present invention, since the sound adaptor 20 which can record the sounds, and the camera body 10 which can be remotely controlled, are separatable from each other, sounds at a place far away from the camera body 10 can be effectively and clearly recorded. Furthermore, according to the present invention, the time at which the sounds are recorded is independent from the time at which a picture is taken.

In the above-mentioned embodiment, the sound recording operation can be effected independently of the release operation, but the present invention is not limited thereto. Namely, the present invention can be applied to an electronic still camera in which the release operation is in association with the sound recording operation. For instance, the present invention can be advantageously used with a camera in which the release signal is outputted in a predetermined time after the commencement of the sound recording or the sound recording is commenced in the lapse of a predetermined time after the output of the release signal (i.e. after the photographing).

It should be appreciated that the present invention is not limited to the illustrated embodiment. For example, the infrared type of remote control device mentioned above can be replaced with an electromagnetic wave type of remote control device, in which an electromagnetic wave is used as a signal transmission medium between the signal transmitter and the signal receiver, or on ultrasonic type of remote control device, in which a ultrasonics is used as the signal transmission medium.

Figure 3:
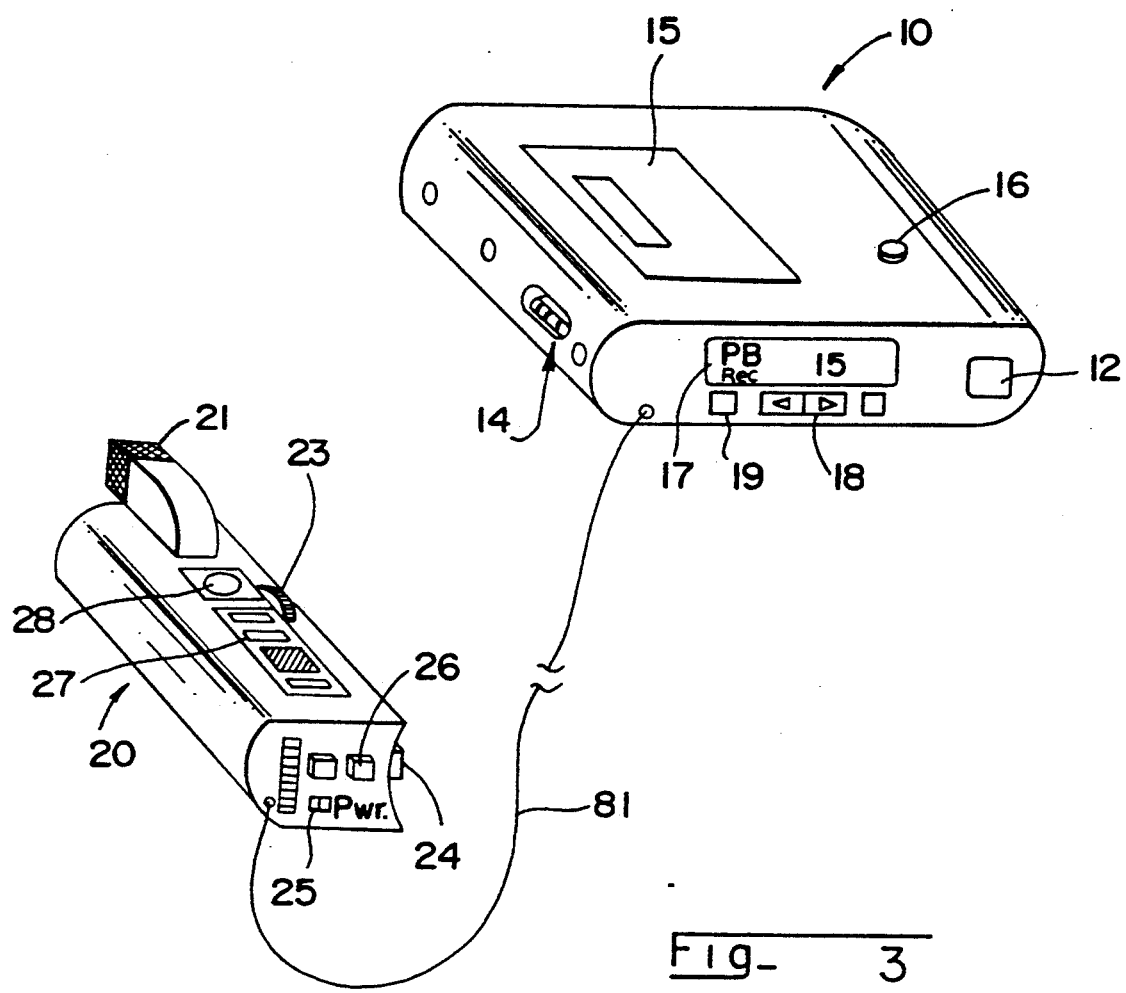

Furthermore, it is also possible to connect the camera body 10 (the body controller 42) and the sound adaptor 20 (the adaptor controller 67) by an electrical conductor (cable) or an optical fiber 81, which is used as a signal transmission medium, between the camera body 10 and the sound adaptor 20 (as shown in FIG. 3).

Other signal transmission media can also be utilized, so long as the camera body 10 can be remotely controlled by the separate sound adaptor 20.

As can be seen from the above description, according to the present invention, since the detachable sound adaptor has a remote control function and a sound recording function, pictures and sounds can be independently recorded at a place away from the camera body. Furthermore, the voice of an object located at a place far away from the camera body can be clearly recorded.

We claim:

1. An electronic still camera having a remote control device, comprising:
   a camera body having means for recording electrical picture signals which are converted by an image pickup device and electrical sound signals which are converted by a sound receiver onto a recording medium; and
   an adaptor that is detachably mounted to said camera body,
   said adaptor comprising means for temporarily memorizing sounds for a predetermined period of time prior to outputting said sounds to said camera body, and remote control operating means for outputting a remote control signal for remotely controlling the operation of said camera body;
   said camera body comprising means for controlling the operation of said electronic still camera in accordance with said remote control signal from said remote control operating means.

2. An electronic still camera according to claim 1, wherein said control means commences photographing in response to remote control signal from remote control operating means.

3. An electronic still camera according to claim 1, wherein said memorizing means of said adaptor transfers said memorized sound signals to said recording means of said camera body when said adaptor is mounted onto said camera body.

4. An electronic still camera according to claim 1, wherein said memorizing means of adaptor comprises a RAM for storing sound signals.

5. An electronic still camera according to claim 1, wherein said remote control signals comprises an infrared signal.

6. An electronic still camera according to claim 5, wherein said control means comprises means for receiving said infrared signal.

7. An electronic still camera according to claim 1, wherein said remote control signal comprises an electromagnetic wave signal, and wherein said control means comprises means for receiving said electromagnetic wave signal.

8. An electronic still camera according to claim 1, wherein said remote control signal comprises an ultrasonic signal, and wherein said control means comprises means for receiving said ultrasonic signal.

9. An electronic still camera according to claim 1, further comprising a cable which connects said remote control operating means to said control means to transmit and receive said remote control signal therebetween.

10. An electronic still camera according to claim 2, wherein said remote control operating means of such adaptor transmits a release signal to said camera body during the memorization of said sound signals into said memorizing means.

11. An electronic still camera according to claim 10, wherein said memorizing means commences the memorization in the lapse of a predetermined time after the output of said remote control signal.

12. An electronic still camera according to claim 1, wherein said remote control device comprises a signal emitter provided on said adaptor and a signal receiver provided on said camera body.

13. An electronic still camera according to claim 12, wherein said signal emitter comprises an infrared emitter and said signal receiver comprises an infrared receiver.

14. An electronic still camera having a remote control device, comprising:
   a camera body having means for recording electrical picture signals and means for recording electrical sound signals; and
   an adaptor member that is adapted to be attached to and detached from said camera body;
   said adaptor comprising means for temporarily storing sound, means for outputting a remote control signal for controlling operation of said camera body and means for transmitting said stored sound signals to said camera body,
   wherein said adaptor is operative, at least when said adaptor is detached from said camera body, for temporarily storing sound in said storage means and, when said adaptor is attached to said camera body, for transmitting said stored sounds to said camera body.

15. An adaptor comprising means for detachably attaching said adaptor to an instrument, means for memorizing sounds while said adaptor is detached from said instrument, and means for transmitting a control signal to a remote location to control a prescribed function of said instrument.

16. An adaptor according to claim 15, wherein said instrument comprises a camera.

17. An adaptor according to claim 15, wherein said adaptor further comprises a microphone.

18. An adaptor according to claim 16, wherein said attaching means comprises an electrical connector.

19. An adaptor according to claim 18, wherein said attaching means further comprises a mechanical connector for integrally coupling said adaptor to said instrument.

20. An adaptor according to claim 15, wherein said attaching means comprises means for accommodating an electrical cord.

21. An adaptor according to claim 19, wherein said attaching means further comprises means for accommodating an electrical cord.

22. An adaptor according to claim 16, wherein said memorizing means comprises a RAM.

23. An adaptor according to claim 16, wherein said transmit means comprises switch means for controlling at least one of a recording and playback operation of said camera.

24. An adaptor according to claim 16, wherein said memorizing means comprises means for transferring said memorized sounds, in the form of signals, to said camera when said adaptor is attached to said camera.

25. An adaptor according to claim 16, wherein said transmitting means comprises means for transmitting an infrared signal.

* * * * *